United States Patent
Wu et al.

(10) Patent No.: US 9,881,424 B2
(45) Date of Patent: Jan. 30, 2018

(54) VIRTUAL REALITY DISPLAY METHOD AND SYSTEM

(71) Applicant: BOE TECHNOLOGY GROUP CO., LTD., Beijing (CN)

(72) Inventors: Naifu Wu, Beijing (CN); Bei Niu, Beijing (CN); Wei Wei, Beijing (CN); Tao Wang, Beijing (CN); Kun Wu, Beijing (CN); Chia-Chiang Lin, Beijing (CN); Chunmiao Zhou, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 15/110,327

(22) PCT Filed: Dec. 18, 2015

(86) PCT No.: PCT/CN2015/097875
§ 371 (c)(1),
(2) Date: Jul. 7, 2016

(87) PCT Pub. No.: WO2017/020489
PCT Pub. Date: Feb. 9, 2017

(65) Prior Publication Data
US 2017/0039769 A1     Feb. 9, 2017

(30) Foreign Application Priority Data

Aug. 3, 2015    (CN) .......................... 2015 1 0483388

(51) Int. Cl.
*G06T 19/00*      (2011.01)
*G06F 3/01*      (2006.01)
(Continued)

(52) U.S. Cl.
CPC ............ *G06T 19/006* (2013.01); *G06F 3/011* (2013.01); *G06T 5/00* (2013.01); *G06T 7/90* (2017.01)

(58) Field of Classification Search
CPC . H04N 2201/3245; G06T 19/006; G06T 7/50; G06T 7/70; G06T 7/74; G06T 5/00
See application file for complete search history.

(56) References Cited

U.S. PATENT DOCUMENTS

| | | | |
|---|---|---|---|
| 7,212,687 B2 * | 5/2007 | Ohshima | G06T 19/006 348/E5.058 |
| 9,619,911 B2 * | 4/2017 | Pandey | G02B 27/0172 |
| 2014/0029804 A1 * | 1/2014 | Kawaguchi | G06T 11/60 382/105 |

FOREIGN PATENT DOCUMENTS

| | | |
|---|---|---|
| CN | 1969296 A | 5/2007 |
| CN | 101208723 A | 6/2008 |

(Continued)

OTHER PUBLICATIONS

Written Opinion of the International Searching Authority from corresponding PCT Application No. PCT/CN2015/097875 (4 pages).

(Continued)

*Primary Examiner* — Antonio A Caschera
(74) *Attorney, Agent, or Firm* — Harness, Dickey & Pierce, P.L.C.

(57) ABSTRACT

Embodiments of the present invention relates to the technical field of augmented reality. A virtual reality display method includes: acquiring a real scene picture; retrieving from the real scene picture a target image having the same shape and color with a sample image, and extracting the space coordinates of the target image; and shielding off or highlighting the target image according to the space coordinates. From the perspective of subtraction and on the basis (Continued)

of a real scene, the virtual reality display method and system according to the embodiment of the present invention achieve the effect of shielding off or weakening interference information of the real scene and highlighting the real subject of interest by means of shielding off or highlighting.

14 Claims, 2 Drawing Sheets

(51) Int. Cl.
*G06T 5/00* (2006.01)
*G06T 7/90* (2017.01)

(56) References Cited

FOREIGN PATENT DOCUMENTS

| | | |
|---|---|---|
| CN | 101620676 A | 1/2010 |
| CN | 103310445 A | 9/2013 |
| CN | 103400119 A | 11/2013 |
| CN | 103533332 A | 1/2014 |
| CN | 103975268 A | 8/2014 |
| CN | 104167013 A | 11/2014 |
| CN | 105095905 A | 11/2015 |
| CN | 105139349 A | 12/2015 |
| JP | 2000153068 A | 6/2000 |
| WO | WO-2006/089417 A1 | 8/2006 |
| WO | WO-2013/052855 A2 | 4/2013 |

OTHER PUBLICATIONS

Office Action from corresponding Chinese Application No. 201510483388.X, dated May 31, 2017 (6 pages).

* cited by examiner

VIRTUAL REALITY DISPLAY METHOD AND SYSTEM

TECHNICAL FIELD

Embodiments of the present invention relate to the technical field of augmented reality, in particular to a virtual reality display method and system.

BACKGROUND

Augmented reality technique (AR) is a new technique developed on the basis of virtual reality, which improves a user's perception of the real world through information provided by a computer system, and superimposes virtual objects, scenes or system prompt information generated by a computer on a real scene, thereby achieving "augmenting" the reality. The AR superimposes virtual objects or non-geometrical information about real objects generated by the computer on a scene in the real world, thereby achieving augmenting the real world. Meanwhile, because the connection with the real world is not cut off, the interaction manner appears to be natural.

Such a technique is usually applied to a head-mounted display device, and has the characteristics of virtual and real combination, real-time interaction and 3D registration.

Virtual and real combination: the AR can extend the display screen to the real environment, superimposing the computer window and icons on real objects, and performing operations by eyes gazing or gesture pointing; it can interactively change the shape and appearance of a 3D object in the panorama view of the user according to the current task or as required; it can produce the augmentation effect similar to X-ray fluoroscopy for the real object by superimposing a virtual scene; it can directly insert map information into a real landscape to guide the actions of a driver; and it can invoke to see the outdoor scene through a virtual window, enabling the wall to seem transparent.

Real-time interaction: the AR extends the interaction from an accurate position to the entire environment, developing from a simple person-facing-screen communication to merging oneself into the surrounding space and objects. Using an information system is no longer a conscious and deliberate separate action, and is naturally integrated with the current activities of the person. The interactive system is no longer limited to a specific position, and is expanded to the entire environment.

3D registration: namely, adjusting the augmented information generated by the computer according to the movement of the user in the 3D space.

Most of the existing virtual reality display methods are in an addition form, namely, a virtual scene is superimposed on the real scene to help the person to get better interactive experience. However, in some cases, some interference information of the real scene needs to be shielded off or weakened to highlight some real subjects of interest.

SUMMARY

(1) Technical Problem to be Solved

The problem to be solved by the present invention is: how to shield off or weaken interference information of a real scene in a virtual reality display.

(2) Technical Solution

To solve the technical problem, an embodiment of the present invention provides a virtual reality display method, comprising:

acquiring a real scene picture;
retrieving from the real scene picture a target image having the same shape and color with a sample image, and extracting the space coordinates of the target image;
shielding off or highlighting the target image according to the space coordinates.

According to an exemplary embodiment of the present invention, the step of retrieving from the real scene picture a target image having the same shape and color with the sample image comprises:

performing gray scale processing on the real scene picture to display the picture in gray;
retrieving and identifying the contours of different images in the real scene picture to identify quasi-target images having the same shape with the sample image;
identifying the colors of the quasi-target images to identify the target image having the same color with the sample image.

According to an exemplary embodiment of the present invention, the step of shielding off or highlighting the target image according to the space coordinates comprises: shielding off the target image by blurring the target image.

According to an exemplary embodiment of the present invention, the step of shielding off or highlighting the target image according to the space coordinates comprises: shielding off the non-target image portion of the real scene image while highlighting the target image.

According to an exemplary embodiment of the present invention, the virtual reality display method further comprises: retrieving and displaying additional information related to the target image through the Internet while highlighting the target image.

An embodiment of the present invention further provides a virtual reality display system, comprising:

a picture acquisition unit for acquiring a real scene picture;
an image retrieval unit for retrieving from the real scene picture a target image having the same shape and color with the sample image and extracting the space coordinates of the target image;
an image processing unit for shielding off or highlighting the target image according to the space coordinates.

According to an exemplary embodiment of the present invention, the image retrieval unit comprises:

a gray scale processing unit for performing gray scale processing on the real scene picture to display the picture in gray;
a contour identifying unit for retrieving and identifying the contours of different images in the real scene picture to identify quasi-target images having the same shape with the sample image;
a color identifying unit for identifying the colors of the quasi-target images to identify the target image having the same color with the sample image.

According to an exemplary embodiment of the present invention, the image processing unit shields the target image by blurring the target image.

According to an exemplary embodiment of the present invention, the image processing unit is for shielding off the non-target image portion of the real scene image while highlighting the target image.

According to an exemplary embodiment of the present invention, the image processing unit is further for retrieving and displaying additional information related to the target image through the Internet while highlighting the target image.

(3) Beneficial Effects

From the perspective of subtraction and on the basis of a real scene, the virtual reality display method and system according to embodiments of the present invention achieve the effects of shielding off or weakening interference information of the real scene and highlighting the real subject of interest by means of shielding off or highlighting.

DETAILED DESCRIPTION

Specific implementation of the present invention will be further described hereinafter in connection with the drawings and embodiments. The following embodiments are given by way of illustration only, and thus are not limiting the scope of the present invention.

Figure 1:
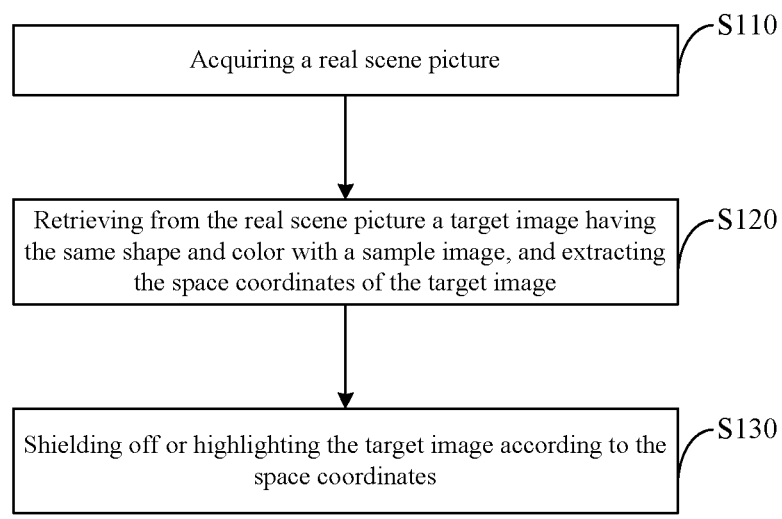
FIG. 1 is a flow diagram of a virtual reality display method of an embodiment of the present invention.

As shown in FIG. 1, a virtual reality display method of an embodiment of the present invention comprises:

Step S110, acquiring a real scene picture. In the step, the real scene picture may be captured through a camera on a head-mounted device, and displayed on the display screen of the head-mounted device for the person to see.

Step S120, retrieving from the real scene picture a target image having the same shape and color with the sample image, and extracting the space coordinates of the target image. The sample image may be an image preset by the user and related to the information of interest or concern to the user; the image may be formed by a shape and color contained therein; and the images with the same shape but different colors are different images.

Step S130, shielding off or highlighting the target image according to the space coordinates, the space coordinates being for positioning the target image to be shielded or highlighted. For example, when faced with various embedded advertisements and promotions (especially when watching TV plays), the advertisements may be shielded if the advertisements are undesirable. Taking another example, still faced with various advertisements, especially in the open air, the sample image may be set as a brand slogan or logo, then the set brand slogan or logo may be retrieved in the field of view and highlighted (e.g. enlarged display, improving the brightness of color or definition of the area) after being retrieved. Through shielding off or highlighting the target image, the person may only see the information of concern or interest through the display screen of the head-mounted device.

From the perspective of subtraction and on the basis of a real scene, the virtual reality display method and system according to the embodiment of the present invention achieve the effects of shielding off or weakening interference information of the real scene and highlighting the real subject of concern by means of shielding off or highlighting.

Figure 2:
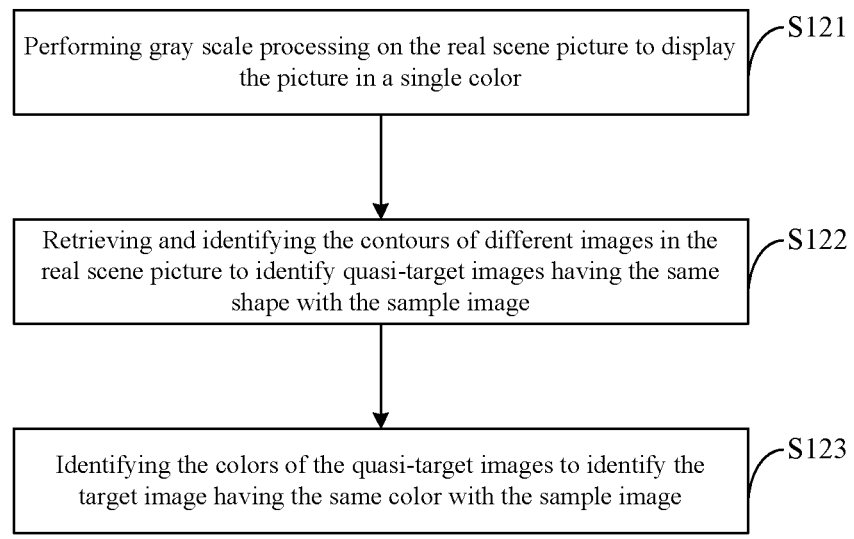
FIG. 2 is the specific flow diagram of the step S120 in FIG. 1.

According to an exemplary embodiment of the present invention, in the step S120, the target image is retrieved primarily by means of image processing and secondarily by means of color processing. As shown in FIG. 2, the specific flow comprises:

Step S121, performing gray scale processing on the real scene picture to display the picture in a single color, thereby facilitating identifying the contours of different images in the real scene image.

Step S122, retrieving and identifying the contours of different images in the real scene picture to identify quasi-target images having the same shape with the sample image;

Step S123, identifying the colors of the quasi-target images to identify the target image having the same color with the sample image;

The steps S122 and S123 may be realized by using existing mature graphic image processing algorithms, so details thereof will not be given here.

According to an exemplary embodiment of the present invention, if the target image is to be shielded, the target image may be shielded in the step S130 by means of blurring the target image, namely, the area where the target image is located is displayed blurred while the areas except for the target image are displayed clearly.

According to an exemplary embodiment of the present invention, if the target image is to be highlighted, the non-target image portion of the real scene image may be shielded while the target image may be highlighted in the step S130, namely, the area where the non-target image is located is displayed blurred to highlight the target image.

According to an exemplary embodiment of the present invention, in order to provide better user experience, additional information related to the target image is retrieved and displayed through the Internet while the target image is highlighted. For example, sales promotion information of commodities of interest to the user may be retrieved and displayed through the mobile Internet.

Figure 3:
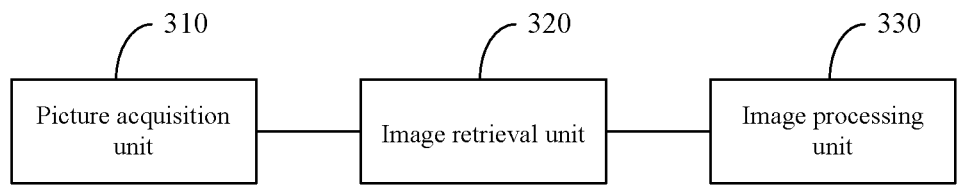
FIG. 3 is a schematic structure diagram of a virtual reality display system of an embodiment of the present invention.

An embodiment of the present invention further provides a virtual reality display system, the structure thereof being as shown in FIG. 3, comprising:

a picture acquisition unit 310 for acquiring a real scene picture;

an image retrieval unit 320 for retrieving from the real scene picture a target image having the same shape and color with the sample image and extracting the space coordinates of the target image;

an image processing unit 330 for shielding off or highlighting the target image according to the space coordinates.

Figure 4:
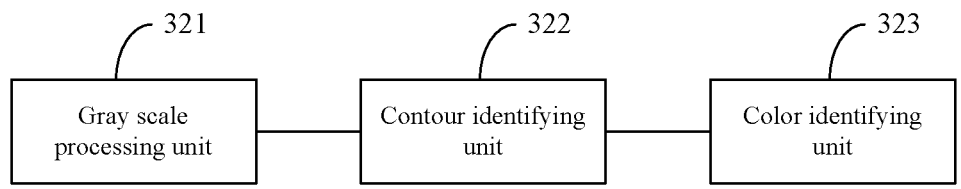
FIG. 4 is a specific structure diagram of the image retrieval unit 320 in FIG. 3.

According to an exemplary embodiment of the present invention, the image retrieval unit 320, as shown in FIG. 4, comprises:

a gray scale processing unit 321 for performing gray scale processing on the real scene picture to display the picture in a single color;

a contour identifying unit 322 for retrieving and identifying the contours of different images in the real scene picture to identify quasi-target images having the same shape with the sample image;

a color identifying unit 323 for identifying the colors of the quasi-target images to identify the target image having the same color with the sample image.

According to an exemplary embodiment of the present invention, the image processing unit 330 shields the target image by blurring the target image.

According to an exemplary embodiment of the present invention, the image processing unit 330 is for shielding off the non-target image portion of the real scene image while highlighting the target image.

According to an exemplary embodiment of the present invention, the image processing unit 330 is further for retrieving and displaying additional information related to the target image through the Internet while highlighting the target image.

The embodiments above are given by way of illustration only, and thus are not limiting the present invention. For those ordinary skilled in the art, the present invention may have various changes and variations without deviating from the spirit and scope of the present invention. Therefore, all equivalent technical solutions are included in the scope of the present invention, and the protection scope of the present invention should be defined by the claims.

The invention claimed is:

1. A virtual reality display method, the method comprising:
   acquiring, by a picture acquisition unit of a virtual reality display system, a real scene picture;
   retrieving, by an image retrieval unit of the virtual reality display system, from the real scene picture a target image having a same shape and color as a sample image;
   extracting, by the image retrieval unit, space coordinates of the target image; and
   displaying, by an image processing unit of the virtual reality display system, the real scene picture with the target image shielded off or highlighted according to the space coordinates,
   wherein retrieving from the real scene picture a target image having the same shape and color as a sample image comprises:
      performing, by the image retrieval unit, gray scale processing on the real scene picture to display the picture in gray;
      retrieving and identifying, by the image retrieval unit, contours of different images in the real scene picture to identify quasi-target images having the same shape as the sample image; and
      identifying, by the image retrieval unit, colors of the quasi-target images to identify a target image having the same color as the sample image.

2. The virtual reality display method according to claim 1, wherein displaying the real scene picture with the target image shielded off or highlighted according to the space coordinates comprises:
   shielding off, by the image processing unit, the target image by blurring the target image.

3. The virtual reality display method according to claim 2, further comprising:
   retrieving and displaying, by the image processing unit, additional information related to the target image through the Internet while highlighting the target image.

4. The virtual reality display method according to claim 1, wherein displaying the real scene picture with the target image shielded off or highlighted according to the space coordinates comprises:
   shielding off, by the image processing unit, the non-target image portion of the real scene image while highlighting the target image.

5. The virtual reality display method according to claim 4, further comprising:
   retrieving and displaying, by the image processing unit, additional information related to the target image through the Internet while highlighting the target image.

6. The virtual reality display method according to claim 1, further comprising:
   retrieving and displaying, by the image processing unit, additional information related to the target image through the Internet while highlighting the target image.

7. The virtual reality display method according to claim 1, further comprising
   retrieving and displaying, by the image processing unit, additional information related to the target image through the Internet while highlighting the target image.

8. A virtual reality display system, comprising:
   a picture acquisition unit for acquiring a real scene picture;
   an image retrieval unit for retrieving from the real scene picture a target image having a same shape and color as a sample image and extracting space coordinates of the target image; and
   an image processing unit for displaying the real scene picture with the target image shielded off or highlighted according to the space coordinates,
   wherein the image retrieval unit comprises:
      a gray scale processing unit for performing gray scale processing on the real scene picture to display the picture in gray;
      a contour identifying unit for retrieving and identifying contours of different images in the real scene picture to identify quasi-target images having a same shape as the sample image; and
      a color identifying unit for identifying the colors of the quasi-target images to identify a target image having the same color as the sample image.

9. The virtual reality display system according to claim 8, wherein the image processing unit shields the target image by blurring the target image.

10. The virtual reality display system according to claim 9, wherein the image processing unit is further configured to retrieve and display additional information related to the target image through the Internet while highlighting the target image.

11. The virtual reality display system according to claim 8, wherein the image processing unit is configured to shield off the non-target image portion of the real scene image while highlighting the target image.

12. The virtual reality display system according to claim 11, wherein the image processing unit is further configured to retrieve and display additional information related to the target image through the Internet while highlighting the target image.

13. The virtual reality display system according to claim 8, wherein the image processing unit is further configured to retrieve and display additional information related to the target image through the Internet while highlighting the target image.

14. The virtual reality display system according to claim 8, wherein the image processing unit is further configured to retrieve and display additional information related to the target image through the Internet while highlighting the target image.

* * * * *